United States Patent
Kounavis (10) Patent No.: US 10,755,386 B2
(45) Date of Patent: Aug. 25, 2020

(54) MEDIAN FILTERING OF IMAGES USING DIRECTED SEARCH

(71) Applicant: Intel Corporation, Santa Clara, CA (US)

(72) Inventor: Michael Kounavis, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 438 days.

(21) Appl. No.: 15/198,399

(22) Filed: Jun. 30, 2016

(65) Prior Publication Data

US 2018/0005353 A1   Jan. 4, 2018

(51) Int. Cl.
| | | |
|---|---|---|
| *G06T 5/00* | (2006.01) | |
| *G06T 5/20* | (2006.01) | |
| *G06T 5/40* | (2006.01) | |
| *G06K 9/46* | (2006.01) | |
| *H04N 5/217* | (2011.01) | |

(52) U.S. Cl.
CPC ............ *G06T 5/002* (2013.01); *G06K 9/4647* (2013.01); *G06T 5/20* (2013.01); *G06T 5/40* (2013.01); *G06T 2207/10024* (2013.01); *G06T 2207/20032* (2013.01); *H04N 5/217* (2013.01)

(58) Field of Classification Search
CPC .. G06T 5/40; G06T 5/20; G06T 5/008; G06T 5/002; G06T 2207/20012; G06T 2207/20182; G06K 9/4647
See application file for complete search history.

(56) References Cited

U.S. PATENT DOCUMENTS

| | | | | |
|---|---|---|---|---|
| 7,010,163 | B1 * | 3/2006 | Weiss ........................ | G06T 5/20 382/168 |
| 7,889,923 | B1 * | 2/2011 | Carr .......................... | G06T 5/40 382/168 |
| 2007/0183682 | A1 * | 8/2007 | Weiss ........................ | G06T 5/20 382/261 |
| 2008/0019607 | A1 * | 1/2008 | Star-Lack ............ | A61N 5/1049 382/264 |

(Continued)

OTHER PUBLICATIONS

Anup Basu, et al., "Algorithms and Hardware for Efficient Image Smoothing," paper, University of Rochester, Dec. 1984, 22 pages.

(Continued)

*Primary Examiner* — Jingge Wu
(74) *Attorney, Agent, or Firm* — International IP Law Group, P.L.L.C.

(57) ABSTRACT

Median filtering of images is described using a directed search. In one example a method includes sliding a first window to a second position on an image to generate a second window where the first window overlaps the second window, determining a second histogram of pixel values by extracting a set of pixels from the first histogram and adding a set of pixels to the first histogram so that the second histogram has only pixels within the second window, determining a second median value of the pixel values using the second histogram by searching pixel values of the second histogram for the median starting at the median value of the first histogram, and repeating sliding the window determining a histogram and determining a median value until a complete median set of an area of interest of the image is determined.

20 Claims, 5 Drawing Sheets

(56) References Cited

U.S. PATENT DOCUMENTS

| | | | | |
|---|---|---|---|---|
| 2008/0100749 | A1* | 5/2008 | Kondo | G06K 9/4619 |
| | | | | 348/687 |
| 2008/0240598 | A1* | 10/2008 | Hasegawa | G06T 5/40 |
| | | | | 382/254 |
| 2008/0298680 | A1* | 12/2008 | Miller | G06T 5/008 |
| | | | | 382/168 |
| 2009/0087092 | A1* | 4/2009 | Min | G06T 5/009 |
| | | | | 382/169 |
| 2013/0287298 | A1* | 10/2013 | Adams | G06T 5/002 |
| | | | | 382/168 |
| 2014/0189320 | A1* | 7/2014 | Kuo | G06F 9/3001 |
| | | | | 712/222 |
| 2015/0305634 | A1* | 10/2015 | Stergiou | A61B 5/02405 |
| | | | | 600/509 |
| 2016/0371821 | A1* | 12/2016 | Hayashi | H04N 5/3572 |
| 2017/0258341 | A1* | 9/2017 | Stergiou | A61B 5/02405 |
| 2017/0299372 | A1* | 10/2017 | Guerrini | G01B 11/026 |
| 2017/0351811 | A1* | 12/2017 | Zhao | G16B 20/00 |

OTHER PUBLICATIONS

Thomas S. Huang, et al., "A Fast Two-Dimensional Median Filtering Algorithm," paper, IEEE Transaction on Acoustics, Speech, and Signal Processing, Feb. 1979, pp. 13-18, vol. ASSP-27, No.1.

Simon Perreault, et al., "Median Filtering in Constant Time," paper, University of Minnesota, IEEE Transactions on Image Processing. 2007, 6 pages.

Sanjay Ranka, et al., "Efficient Serial and Parallel Algorithms for Meridian Filtering," paper, IEEE Transactions on Signal Processing, 1991, 18 pages.

Jukka Suomela, "Median Filtering is Equivalent to Sorting," paper, Helsinki Institute for Information Technology, Jun. 2014, 25 pages.

* cited by examiner

MEDIAN FILTERING OF IMAGES USING DIRECTED SEARCH

FIELD

The present description relates to digital image processing and in particular to processing operations related to a median filter for noise reduction in images.

BACKGROUND

The availability of small high accuracy image sensors has led to a proliferation of small and portable cameras in a wide range of different devices from security systems, to doorbells, to vehicle safety system and then smart phones, tablets, computers, etc. These cameras are combined with processors to provide extensive image processing, some in real time. The image processing opens up a wide range of new functions not previously available Median filtering is a foundation of or a part of many image processing systems. Median filtering is found as a component in many imaging and vision systems, such as computer vision for face or gesture recognition and in computational photography. It is also used in image enhancement, such as image de-noising systems, adaptive histogram equalization, etc.

Median filtering sorts the set of pixel intensity or brightness values to which it is applied and returns a value that ranks exactly at the midpoint or median of the input values. In many cases, median filtering is applied to an entire image using a sliding window that slides across the image until it has covered every pixel. As a result of sorting every pixel, the complexity of median filtering is associated with the number of input pixels. Many median filter methods are applied to small size input data sets such as 3×3 image windows. While a smaller window makes each window easier and faster to compute, many more smaller windows are required in order to filter an entire window than larger windows. In addition, for some purposes a larger window is necessary to obtain a desired filter effect.

BRIEF DESCRIPTION OF THE DRAWINGS

Embodiments are illustrated by way of example, and not by way of limitation, in the figures of the accompanying drawings in which like reference numerals refer to similar elements.

DETAILED DESCRIPTION

A highly efficient median filter implementation is described. The complexity increases linearly as a function of the window row size rather than exponentially. This filter may be implemented in both software and hardware. In one example trial, the latency per pixel increases slowly as the image window size increases and is still low even for large image windows. A latency of 119 clocks per pixel has been obtained for 3×3 windows and a latency of only 161 clocks per pixel is obtained for 15×15 windows. The time spent processing per pixel is substantially less than the time spent to sort the pixels. A 15×15 image window has 225 pixels yet only 119 clocks are used per pixel.

As described, median filtering is often implemented using a sliding window. Each successive window overlaps the one before it as the windows slide across the image. Instead of sorting the elements of an image window every time, a histogram is built and maintained. An initial histogram is built for the first window and then when the image window slides to a new position, the values of the pixels in the previous neighboring image window that are in the new window are used. The values for pixels that are no longer present in the window are removed and the values for the pixels that are added to the new window are added. The new midpoint is computed on the new histogram.

In addition, the midpoint for the next window is computed in an adaptive manner starting from the midpoint computed in the previous window. Knowledge of the values that have been added into and removed from the histogram of the previous window is used. This technique takes advantage of the replication of values inside the window and from one window to the next. Replication of values is common in many images and often appears to be random.

The described technique works well with replicated values and operates quickly using midpoints and differences. By using the previous midpoint, a small, quick search of only a few values is able to find the midpoint of the new histogram. In addition, the second and later windows do not require extensive sorting, saving many computations.

Figure 1:
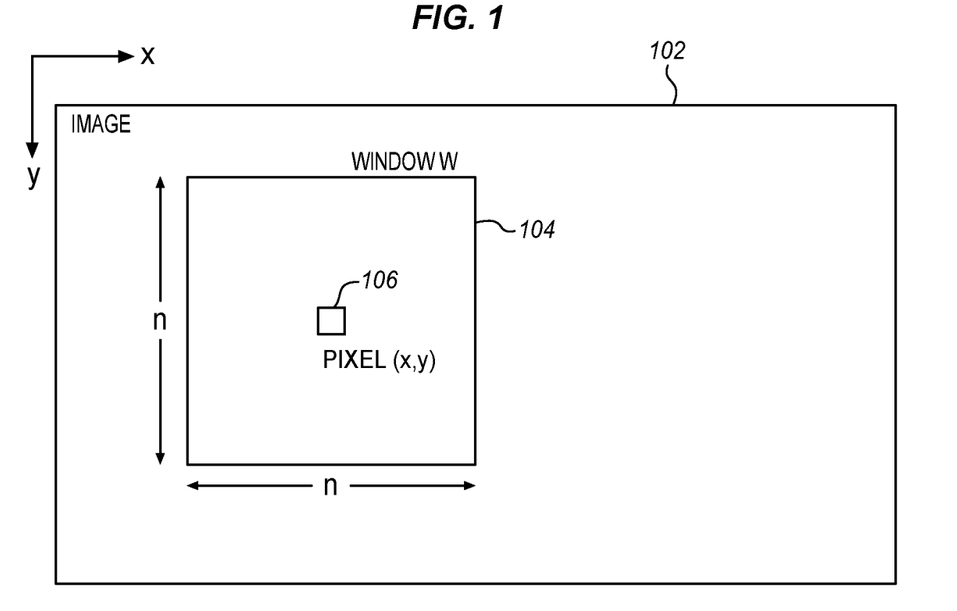
FIG. 1 is a diagram of an image array of pixels with a sliding window and a pixel in the window according to an embodiment.

A median filter may be computed using histogram operations as shown in FIG. 1. FIG. 1 is a diagram of a single image 102 that has an array of pixels that can be identified by a column value x in the horizontal and a row value y in the vertical direction. Each pixel has an intensity value for one or more colors, depending on the capture and encoding system. The pixels may be in any particular color space such as YUV, RGB, Bayer, BW, etc. For purposes of this description, it is assumed that each pixel has a single value and the light intensity value may be referred to as the pixel without distinguishing the physical sensor or position from the light intensity and color value attached to that pixel.

A window 104 is placed on the image. The window has dimensions of n pixels wide by n windows high. As mentioned above, typically n=3, for a 3×3 window, however, the described techniques are useful for much larger windows, e.g. 15×15. With many images having millions of pixels, a larger window may be used to provide faster median filtering. The histogram sorts the value of each pixel into a bin. The median for the window 104 is the midpoint of the histogram for the window. This is shown in the diagram as the central pixel 106. This is the central pixel not due to its physical location in the window but due to its arithmetic location in the histogram.

The median determination may be expresses as follows:
Let L be the sorted list of all pixels in window W
Let n be the number of pixels in length and width of the window W
Let m be the value with rank at the midpoint or the median $$m=(n^2-1)/2 \quad \text{(Eq. 1)}$$

This initial window median determination may be obtained by gathering all of the pixels within the window, sorting them into histogram bins, and then picking the midpoint in the sorted list.

Figure 2:
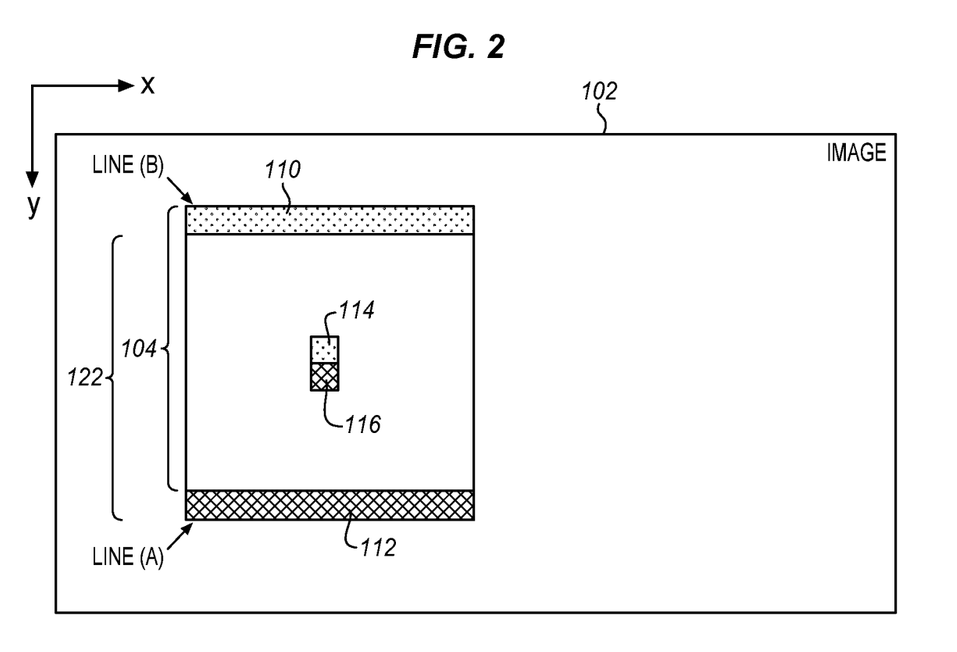
FIG. 2 is a diagram of an image array of pixels with the window of FIG. 1 and a second window from sliding the first window down one row according to an embodiment.

FIG. 2 is a diagram of a second window W+1 that is defined through a sliding window process. The new window 122 is defined by moving the original window 104 vertically downward by one row. While the bottom row of the original window is $y_1$, the bottom row of the second window is $y_1+1=y_2$. In other words, window W+1 results by extracting a first row 110 from one side of the sliding window and adding a new row 112 to the other side of the sliding window. The new row is located immediately after the last row of the original window. Similarly a new histogram can be determined by removing the values for the pixels of the extracted row 110 and adding the values for the pixels of the added new row.

As before the median may be determined using the new histogram as the midpoint. The new median is represented as the new pixel 116 at (x, y+1). For the first median computation at the first window, there was no prior knowledge of the pixel values. However, with the second window, the knowledge of the immediately prior window can be used to simplify the computations to determine the median.

The median determination may be expressed as:

$$m=\text{midpoint}(\text{histogram}(w)-\text{histogram }(B)+\text{histogram }(A)) \quad \text{(Eq. 2)}$$

wherein histogram (w) is the original histogram of the entire first window, histogram (B) is the histogram of the added row 112 and histogram (A) is the histogram of the subtracted row 110.

The described example algorithm uses a vertically sliding window. For each vertical movement, the histogram on the top most window is determined and its midpoint is taken from the histogram. After sliding the window by one row, the window histogram is updated as described in Equation 2. The midpoint of the new histogram is then determined. This process of sliding the window, adjusting the histogram and determining the new median is repeated until all of the sliding windows are determined. This approach may be generalized to different directions, such as horizontal instead of vertical and to more than one dimension. As shown this approach has a linear complexity, rather than a geometric complexity. The maximum number of operations (O(max)) is limited as a linear function of the number of pixels in each row, n, and the range of pixel values, m, O(max(n, m))

Figure 3:
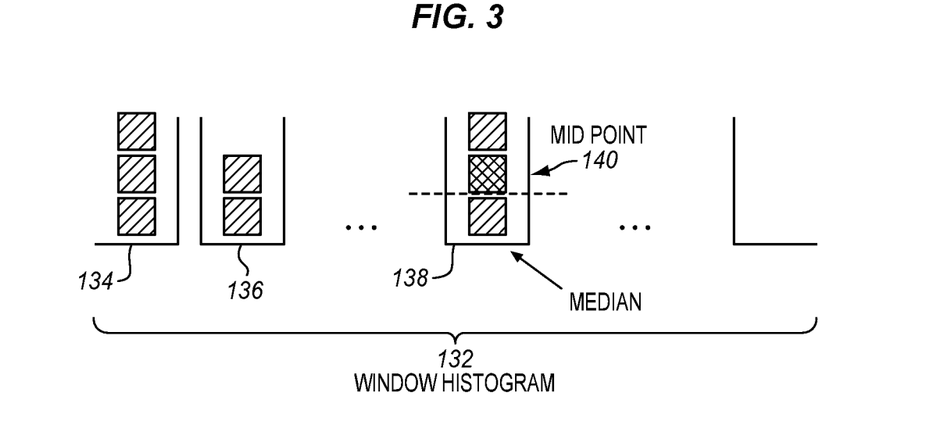
FIG. 3 is a diagram of a portion of a histogram having buckets for different pixel values and pixels within the buckets according to an embodiment.

FIG. 3 is a diagram of a histogram 132 for a particular window and shows a set of buckets or bins 134, 136, 138 of the histogram. Each bucket is associated with a different value, or set of values in a range. Since value replication may occur in a window, each bucket may contain more than one element. With larger ranges, there will be fewer buckets and more pixels in each bucket. The median bucket 132 is selected for the median value for the window.

In addition, in this example the bucket has three pixels. The center pixel 140 is chosen as the midpoint or median element. The exact location of each pixel inside the median bucket is tracked through each step of the sliding window process. The location of the median element inside the median bucket is used in determining where exactly to stop after searching for an exact number of remaining elements before or after the previous median element. This is described in the context of the "remaining" parameter below. In addition, the offset of the median element inside the median histogram bucket is used as the "offset" as described below.

As mentioned above, for the topmost window, the location of the midpoint may be determined in a straightforward manner using a "median assist" process. An example of a median assist process is as shown in the code snippet 1 below. This is software code written in the C programming language, however, any software or firmware language may be used or the technique may be implemented in dedicated hardware for faster execution.

The median assist process initializes the variable called "remaining" to the number of elements that will be counted before reaching the midpoint as $\frac{1}{2}(n^2-1)+1$, where n is the row size or length of the row as shown in FIG. 2 and i indicates the index of the median element. Accordingly, $n^2$ is the total number of elements in a square window of dimensions n×n. $n^2-1$ is the number of elements in the window less the median element. Half of $n^2-1$ the number of elements before or after the median since the median is in the middle. Hence the index of the median is $\frac{1}{2}(n^2-1)+1$.

After initialization, each element of each bucket of the histogram is visited starting from e.g. the left pixel, the number of elements in the bucket from "remaining" is extracted until the resulting value of "remaining" is negative. The exact location of the midpoint inside the median bucket, denoted as "offset", is equal to 'v'+"remaining", where "v" is the number of elements in the median bucket and "remaining" is negative.

Code Snippet 1: Computation on the Midpoint at a Top Most Window

```
//for the first iteration we run the median assist algorithm
    remaining = (n*n-1)/2 + 1;
    offset = 0;
    for(ii = 0; ii < 256; ii++)
    {
        v = frequencies[ii];
        remaining -= v;
        if(remaining <= 0)
        {
            offset = v+remaining;
            break;
        }
    }
```

For all other windows, a new midpoint is computed and the value of "offset" is updated by performing a search starting from the previous midpoint. If the midpoint at window W is known it is very likely that the midpoint at window W+1 will be close to the midpoint of window W. This assumption is true for many different types of signals including two dimensional images.

This use of the offset and of the starting point substantially improves efficiency by starting searches from the previous midpoint. The larger the sliding window, the closer the midpoints will be in each successive window. On the other hand, the median assist feature is not required, any other search may be used as desired to suit the particular implementation and the nature of the sliding window and the data.

The search may be further simplified by tracking the changes with each update. As mentioned, when the sliding window moves from one position to the next, some entries will be removed and other entries will be added based on extracting a row of the previous window and adding a row to form the next window. During this updating the system is able to track the number of entries or pixels that are added to buckets to the left of the previous midpoint or median and during the histogram update step of Eq. (2).

Depending on how the number of entries relates to the "offset" value, the new midpoint for the next window may be found by searching on the left or the right side of the previous midpoint. This is shown in the code snippet 2 below. As shown, the number "left" is computed by adding the sign bit of the number of elements that are added to, or removed from the histogram during the histogram update step.

In summary, the process determines whether more entries were added to the buckets on the left side of the prior median bucket than were removed from the buckets on the left side of the median buckets. If so then the search goes from the prior median bucket to the left. The new median bucket will be to the left. If not, then there were more entries added to the buckets on the right. The search goes to the right side of the prior median bucket. The approach may be reversed so that the buckets to the right are evaluated instead. By directing the search based on the prior median and the incremental changes for the next window, the new median may be found with far fewer steps.

---

Code Snippet 2: Computing The Number of Elements Added to the Left of the Median Bucket in a Histogram Update Step

```
for(ii = i-(n-1)/2; ii<= i+(n-1__/2; ii++
{
    v = src[j-(n-1)/2-1)*ewidth+ii];
    u = src[j+(n-1)/2)*ewidth+ii];
    frequencies[v]--;
    frequencies[u]++;
    left -=(((unsigned int) ((int)v - (int)median)) >> 31);
    left +=(((unsigned int) ((int)u - (int)median)) >> 31);
}
v = src[j*ewidth+i];
u = src[(j-1)*ewidth+i];
frequencies[v]--;
frequencies[u]++;
left -=(((unsigned int) ((int)v - (int)median)) >> 31);
left +=(((unsigned int) ((int)u - (int)median)) >> 31);
```

---

For even faster results, the number of elements to the midpoint may be counted. Knowing the current value of the "offset" variable, i.e. the location of the midpoint inside the median bucket, and knowing the number of elements added on the left hand side of the median bucket, the "remaining" variable may be determined. The "remaining" variable is the number of elements to be traversed forward or backward from the midpoint to complete a search for the median bucket. "Remaining" is defined as:

$$\text{"remaining"}=\text{"offset"}-\text{"left"}+1 \quad (\text{Eq. 3})$$

From the value of the variable "remaining," it may also be determined if the new midpoint is at a different bucket on the left hand side of the current median bucket, or at a different bucket on the right hand side of the current median bucket, or at the same bucket as the current midpoint bucket. If "remaining" is negative the new midpoint is at a different bucket on the left hand side of the current median bucket. If "remaining" is positive, then the new midpoint is at a different bucker on the right hand side of the midpoint. In this case the search and the update of "offset" may be performed as in code snippet 3 below:

---

Code Snippet 3: Search For the New Midpoint on the Left Hand Side of the Median Bucket

```
remaining = offset-left-1;
//remaining = the number of elements to traverse forward/backward in order to find the new midpoint
    if (remaining < 0) //midpoint is at a different bucket on the left
    {
        for(ii = median-1; ii >=0; ii--)
        {
            v = frequencies[ii];
            remaining += v;
            if(remaining >=0)
            {
                offset = remaining+1;
                break;
            }
        }
    }
```

---

In every step of the search of code snippet 3 above, "remaining" is updated by adding the number of elements on the bucket visited. The search stops when "remaining" becomes positive. The new median value is the index of the bucket where the search stops. The location of the new midpoint inside the new median bucket is set as "offset"="remaining"+1.

If "remaining" is positive, a search is made on the bucket where the current median value is, or on the right hand side of the current median bucket. In this case "remaining" is updated by subtracting the number of elements on the bucket visited. The search stops when "remaining" becomes negative. The new median value is the index of the bucket where the search stops. The location of the new midpoint inside the new median bucket is similarly set as "offset"="v"+"remaining," where "v" is the number of elements in the bucket where the search stops. This search is shown in code snippet 4.

---

Code Snippet 4: Search For the New Midpoint on the Right Hand Side of the Median Bucket

```
else // median is on the same bucket or on the right
{
    remaining++;
    for(ii = median; ii < 256; ii++)
    {
        v = frequencies[ii];
        remaining -= v;
        if(remaining <= 0)
        {
            offset = v+remaining;
            break;
        }
    }
}
```

---

A test has been performed on a general purpose processor using test software that has not been optimized for the tasks. In this test, the number of clocks spent per pixel for the approach described above with all three additional features is shown in Table 1. As shown there is a significant constant latency component of about 120 clocks per pixel and a small linear component which is increases by about 20 clocks per pixel for every increase of the window row size by 4 pixels.

TABLE 1

Performance in Clocks per Pixel

| Window size | 3 × 3 | 5 × 5 | 7 × 7 | 11 × 11 | 15 × 15 |
|---|---|---|---|---|---|
| No. of clocks | 119 | 120 | 125 | 145 | 160 |

The techniques described herein may be accelerated using standardized histogram instructions. In this case the midpoint calculation discussed above may be implemented as part of the logic of a midpoint calculation instruction. This approach is shown in Table 2.

Using Table 2, instructions are used to support additions to, or subtractions from histograms. In these instructions, buckets are contained in a first destination register R1. The elements of the rows which are added or subtracted are contained in a second source register R2. The exact values which are inserted or extracted from the histogram are specified by an immediate field I1. Each bucket corresponds to exactly one value from 0-255.

Since the histogram buckets may not fit into a single register, the histogram may be considered as spanning several registers (e.g., in an AVX 512 realization the space of 0-255 can be split into 4 regions: 0-63, 64-127, 128-191, 192-255). An immediate field I1 would specify the region of interest (e.g., 0-3). The ADDHIST instruction takes only the values which are in the specified region (from R2) and adds them to the corresponding buckets of R1. The SUBHIST instruction takes only the values which are in the specified region from R2 and subtracts them from the corresponding buckets of R1.

A get midpoint instruction GETMIDP returns a new midpoint using a previous midpoint value M1. The GETMIDP instruction may also return an updated value for "remaining," if the search exceeds the range of histogram register R1. Immediate field/register M1 holds a previous midpoint value. Immediate field/register M1 may also hold a previous value for "remaining" in case the search for the new midpoint spans several histogram registers.

TABLE 2

Instructions suitable for finding median in a sliding window

ADDHIST R1, R2, I1
add R2 into histogram buckets R1 using range I1
SUBHIST R1, R2, I1
subtract R2 from histogram buckets R1 using range I1
GETMIDP R1, M1
get midpoint from histogram R1 based on a previous midpoint value M1

This high performance technique is suitable for a variety of different products that support imaging or machine vision functions, such as object recognition and image understanding. The technique is simple, very efficient and can be realized in many different ways ranging from microcode and firmware to higher level software, new instruction-based realizations and specialized logic.

Figure 4:
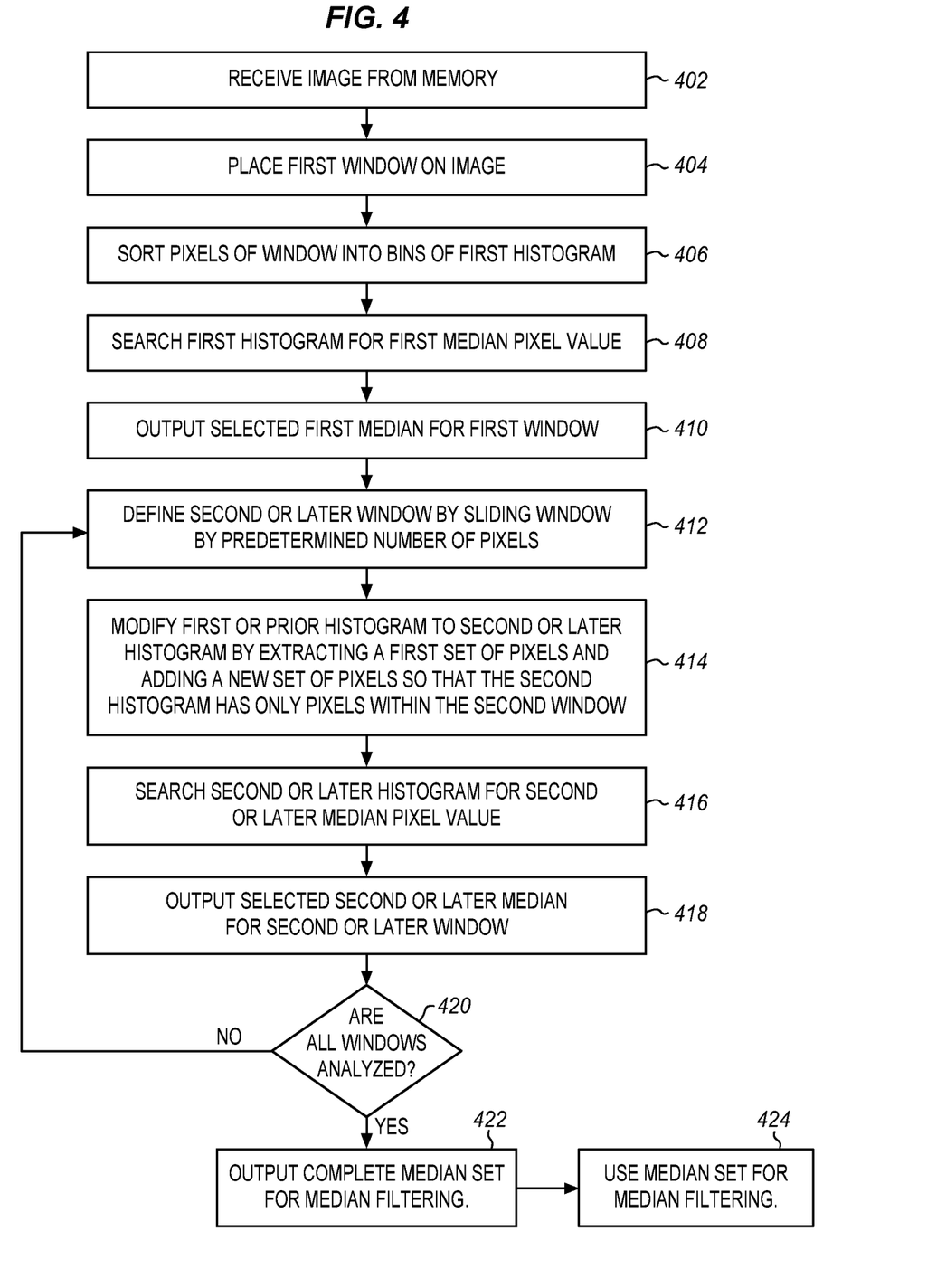
FIG. 4 is a process flow diagram of generating median filter values using histograms for a sliding window according to an embodiment.

The techniques described above are shown in the process flow diagram of FIG. 4. At 402 an image is received from a memory, either a mass storage device, a video or image processing system buffer, or an image sensor buffer. The image may be a single image or one from a sequence of images for a video.

At 404 a window W is placed on the image. The window covers some number of pixels of the image and may be square or rectangular in terms of pixels. In the examples above, the windows are 3×3, 7×7, or 15×15 but any other size may be used, depending on the particular implementation. Each pixel has a brightness value in some color space and at 406 the value of each pixel of the window is sorted into a bin of a histogram. At 408 a search of the histogram is conducted to find the median pixel value for the histogram. This selected median may be the midpoint of the histogram. In addition, the particular pixel or element in the bin may be selected as the middle pixel.

At 410 this median is stored as the filter result for the first window.

At 412 a second window W+1 is defined through a sliding window process. In the above example this is defined by moving the original window vertically downward by one row. In some embodiments, when the vertical sliding window reaches the end of the rows, the window will then be moved by one column. The ordering of successive windows may be defined in any of a variety of different ways. The windows may always slide from top to bottom or alternate top to bottom and bottom to top. The windows may first slide vertically, then horizontally or first horizontally and then vertically or in some other pattern.

After the second window is defined, then the histogram for the first window is modified to correspond to the second window at 414. This is done by extracting a first row from one side of the sliding window and adding a new row to the other side of the sliding window. The new row is located immediately after the last row of the original window.

At 416, a search is conducted to find the median for the second histogram. At 418 the selected second median for the second window is output. At 420 it is determined whether all of the windows have been analyzed. If not the process returns to 412 to slide the window, modify the previous histogram and find new medians. This continues until the entire image or the entire portion of interest of the image has been analyzed. After this the process goes to 422 to output a complete set of medians for use in median filtering. At 424 the median set is used for median filtering. Given the determined medians, the filtering may be applied in any of a variety of different ways for noise reduction, shape analysis, machine vision and many other purposes.

Figure 5:
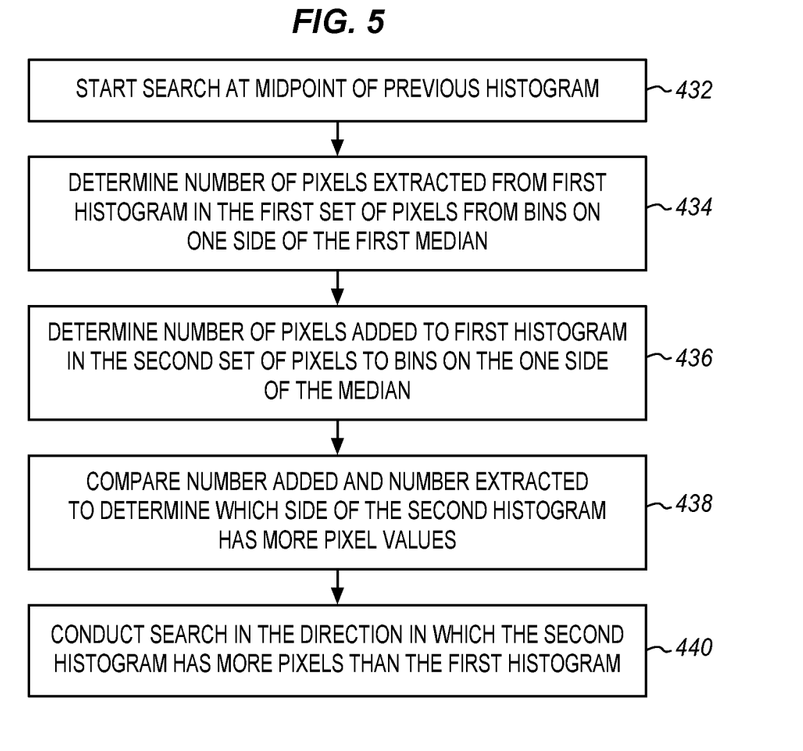
FIG. 5 is a process flow diagram of guiding a search through a histogram for a median filter according to an embodiment.

FIG. 5 is a process flow diagram that may be used for the search of the second and later histograms using the new histogram as the midpoint. This search is aided by a median assist process as described above. At 432 a search for the median pixel is started at the median of the previous histogram. At 434 the number of pixels extracted from the second histogram in the first set of pixels from bins on one side of the first median is determined. This flows directly from the process of adding new pixels to form the second histogram. Similarly at 436 the number of pixels added to the second histogram in the second set of pixels to bins on the one side of the median is determined. As described above this one side is the left side, but it may be the right side instead. At 438 the number added and the number extracted from the one side are compared to determine which side of the second histogram has more pixel values than it did in the first histogram. If the number is zero, then the median is the same.

At 440 the search for the median in the second histogram is conducted in the direction in which the second histogram has more pixels than the first histogram. If the second histogram has more pixels on the left than the first histogram, then the left side will be searched. Similarly if the left side has fewer pixels than in the first histogram, then the right side will be searched.

Figure 6:
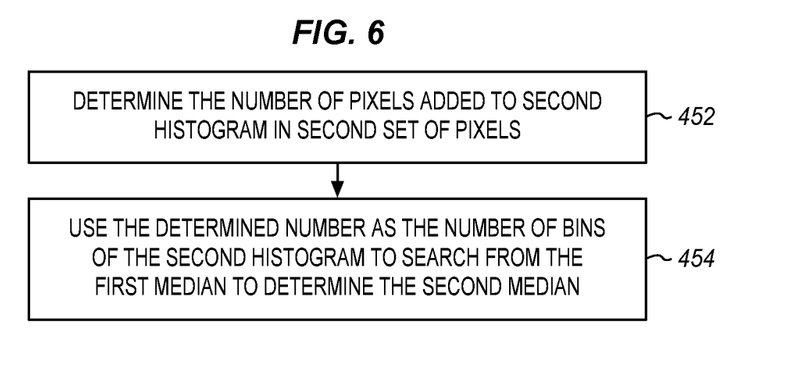
FIG. 6 is a process flow diagram of limiting a search through a histogram for a median filter according to an embodiment.

FIG. 6 is a process flow diagram for enhancing the speed and efficiency of the search using a remaining value. The remaining value limits the search to a certain number of bins on either the left or the right of the previous median bin. At 452 the number of pixels added to the second histogram in the second set of pixels is determined. This number has been identified as "left" above. Then at 454 the determined number is used as the number of bins of the second histogram to search from the first median to determine the second median. This number is identified as "remaining" above and is a value based on an "offset" above. The offset indicates the position of the median bin in the prior histogram. In the description above "remaining" is used as a counter that is decremented as the search progresses. The search is more efficient using the process of FIG. 6 by eliminating unnecessary bins from the search.

Figure 7:
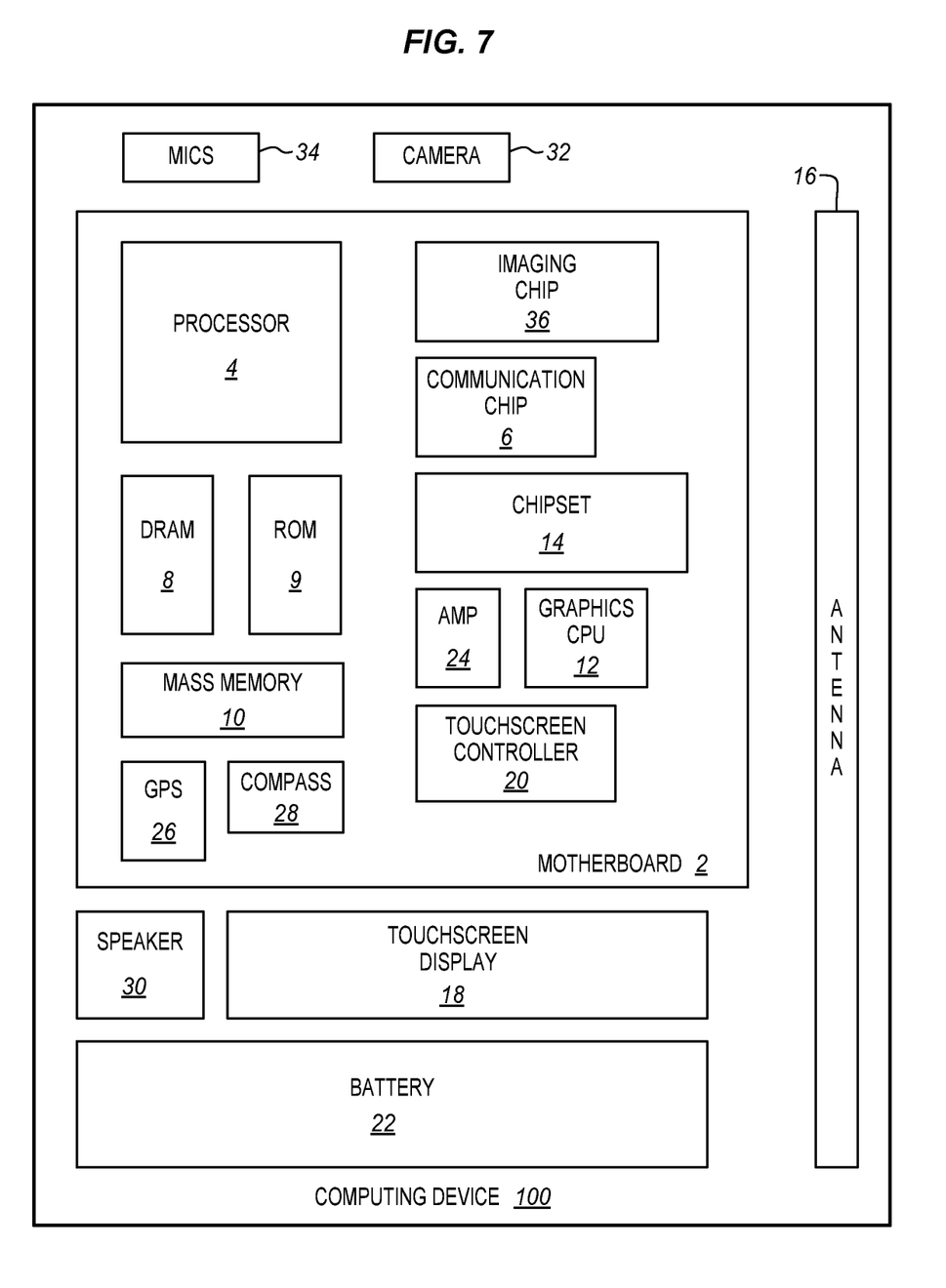
FIG. 7 is a block diagram of a photographic device incorporating median filtering according to an embodiment.

FIG. 7 illustrates a portable image capture device 100 in accordance with one implementation. The imaging device 100 houses a system board 2. The board 2 may include a number of components, including but not limited to a processor 4 and at least one communication package 6. The communication package may be coupled to one or more antennas 16. The processor 4 is physically and electrically coupled to the board 2.

Depending on its applications, image capture device 100 may include other components that may or may not be physically and electrically coupled to the board 2. These other components include, but are not limited to, volatile memory (e.g., DRAM) 8, non-volatile memory (e.g., ROM) 9, flash memory (not shown), a graphics processor 12, a digital signal processor (not shown), a crypto processor (not shown), a chipset 14, an antenna 16, a display 18 such as a touchscreen display, a touchscreen controller 20, a battery 22, an audio codec (not shown), a video codec (not shown), a power amplifier 24, a global positioning system (GPS) device 26, a compass 28, an accelerometer (not shown), a gyroscope (not shown), a speaker 30, one or more cameras 32, a microphone array 34, and a mass storage device (such as hard disk drive) 10, compact disk (CD) (not shown), digital versatile disk (DVD) (not shown), and so forth). These components may be connected to the system board 2, mounted to the system board, or combined with any of the other components.

The camera array may be coupled to an image chip 36, such as an imaging signal processor and to the processor 4, either directly or through the image chip. The image chip may take a variety of different forms, such as a graphics co-processor, or a separate dedicated imaging management module. Such a module or device may comprise logic, algorithms, and/or instructions operative to capture, process, edit, compress, store, print, and/or display one or more images. These processes may include de-noising, image recognition, image enhancement and other processes described herein. In some embodiments, the imaging management module may comprise programming routines, functions, and/or processes implemented as software within an imaging application or operating system. In various other embodiments, the imaging management module may be implemented as a standalone chip or integrated circuit, or as circuitry comprised within the processor, within a CPU, within a graphics chip or other integrated circuit or chip, or within a camera module.

The communication package 6 enables wireless and/or wired communications for the transfer of data to and from the video device 100. The term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not. The communication package 6 may implement any of a number of wireless or wired standards or protocols, including but not limited to Wi-Fi (IEEE 802.11 family), WiMAX (IEEE 802.16 family), IEEE 802.20, long term evolution (LTE), Ev-DO, HSPA+, HSDPA+, HSUPA+, EDGE, GSM, GPRS, CDMA, TDMA, DECT, Bluetooth, Ethernet derivatives thereof, as well as any other wireless and wired protocols that are designated as 3G, 4G, 5G, and beyond. The video device 100 may include a plurality of communication packages 6. For instance, a first communication package 6 may be dedicated to shorter range wireless communications such as Wi-Fi and Bluetooth and a second communication package 6 may be dedicated to longer range wireless communications such as GPS, EDGE, GPRS, CDMA, WiMAX, LTE, Ev-DO, and others.

The cameras 32 may include all of the components of the camera or share resources, such as memory 8, 9, 10, processing 4 and user interface 12, 20, with other video device components and functions. The processor 4 is coupled to the camera and to memory to receive frames and perform median filtering to produce enhanced images and machine vision as described. The cameras may also include an image processing system, as described above, to share tasks with the processor 4 to generate enhanced or de-noised images.

In various implementations, the image capture device 100 may be a video camera, a digital single lens reflex or mirror-less camera, a cellular telephone, a media player, laptop, a netbook, a notebook, an ultrabook, a smartphone, a wearable device, a tablet, a personal digital assistant (PDA), an ultra mobile PC, or a digital video recorder. The image capture device may be fixed, portable, or wearable. In further implementations, the image capture device 100 may be any other electronic device that records a sequence of image frames and processes data.

Embodiments may be implemented as a part of one or more memory chips, controllers, CPUs (Central Processing Unit), microchips or integrated circuits interconnected using a motherboard, an application specific integrated circuit (ASIC), and/or a field programmable gate array (FPGA).

References to "one embodiment", "an embodiment", "example embodiment", "various embodiments", etc., indicate that the embodiment(s) so described may include particular features, structures, or characteristics, but not every embodiment necessarily includes the particular features, structures, or characteristics. Further, some embodiments may have some, all, or none of the features described for other embodiments.

In the following description and claims, the term "coupled" along with its derivatives, may be used. "Coupled" is used to indicate that two or more elements co-operate or interact with each other, but they may or may not have intervening physical or electrical components between them.

As used in the claims, unless otherwise specified, the use of the ordinal adjectives "first", "second", "third", etc., to describe a common element, merely indicate that different instances of like elements are being referred to, and are not intended to imply that the elements so described must be in a given sequence, either temporally, spatially, in ranking, or in any other manner.

The drawings and the forgoing description give examples of embodiments. Those skilled in the art will appreciate that one or more of the described elements may well be combined into a single functional element. Alternatively, certain elements may be split into multiple functional elements.

Elements from one embodiment may be added to another embodiment. For example, orders of processes described herein may be changed and are not limited to the manner described herein. Moreover, the actions of any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

The following examples pertain to further embodiments. The various features of the different embodiments may be variously combined with some features included and others excluded to suit a variety of different applications. Some embodiments pertain to a method that includes determining a first histogram for pixel values within a first window in a first position on an image by sorting pixels of the first window into bins of the first histogram, determining a median value of the pixel values using the histogram, sliding the first window to a second position on the image to generate a second window where the first window overlaps the second window, determining a second histogram of pixel values by modifying the first histogram by extracting a first set of pixels from the first histogram and adding a second set of pixels to the first histogram so that the second histogram has only pixels within the second window, determining a second median value of the pixel values using the second histogram by searching pixel values of the second histogram for the median starting at the median value of the first histogram, and repeating sliding the window determining a histogram and determining a median value until a complete median set of an area of interest of the image is determined.

Further embodiments include determining a number of pixels extracted from the first histogram in the first set of pixels from bins on one side of the first median, determining a number of pixels added to the first histogram in the second set of pixels to bins on the one side of the median, and comparing the number extracted and the number added to determine which side of the second histogram has more pixel values.

In further embodiments searching comprises searching on the side that has more pixel values.

Further embodiments include determining an offset as a position of an element of the first median value inside a bucket of the median histogram value and determining a remainder as a number of elements to traverse to find the second median value.

Further embodiments include determining a number of pixels added to the second histogram in the second set of pixels and using the determined number as a number of bins of the second histogram to search from the first median to determine the second median.

In further embodiments defining the second window comprises moving the first window by one row.

In further embodiments the first set of pixels corresponds to a first row and the second set of pixels corresponds to a second row.

In further embodiments searching the second histogram comprises starting at the median of the first histogram.

In further embodiments extracting a first set of pixels comprises executing an AVX 512 SUBHIST instruction.

In further embodiments adding a second set of pixels comprises executing an AVX 512 ADDHIST instruction.

In further embodiments searching the second histogram comprises executing an AVX 512 GETMIDP instruction using the first median as the M1 starting point.

Further embodiments include receiving the image from memory and placing the first window on the image.

Some embodiments include a computer-readable medium having instructions stored thereon that when operated on by the computer cause the computer to perform operations that include determining a first histogram for pixel values within a first window in a first position on an image by sorting pixels of the first window into bins of the first histogram, determining a median value of the pixel values using the histogram, sliding the first window to a second position on the image to generate a second window where the first window overlaps the second window, determining a second histogram of pixel values by modifying the first histogram by extracting a first set of pixels from the first histogram and adding a second set of pixels to the first histogram so that the second histogram has only pixels within the second window, determining a second median value of the pixel values using the second histogram by searching pixel values of the second histogram for the median starting at the median value of the first histogram, and repeating sliding the window determining a histogram and determining a median value until a complete median set of an area of interest of the image is determined.

Further embodiments include determining a number of pixels extracted from the first histogram in the first set of pixels from bins on one side of the first median, determining a number of pixels added to the first histogram in the second set of pixels to bins on the one side of the median, and comparing the number extracted and the number added to determine which side of the second histogram has more pixel values.

In further embodiments searching comprises searching on the side that has more pixel values.

Further embodiments include determining an offset as a position of an element of the first median value inside a bucket of the median histogram value and determining a remainder as a number of elements to traverse to find the second median value.

Further embodiments include determining a number of pixels added to the second histogram in the second set of pixels and using the determined number as a number of bins of the second histogram to search from the first median to determine the second median.

Some embodiments pertain to a computing system that includes a camera to capture an image, an image processor apply a median filter to the image by determining a first histogram for pixel values within a first window in a first position on an image by sorting pixels of the first window into bins of the first histogram, determining a median value of the pixel values using the histogram, sliding the first window to a second position on the image to generate a second window where the first window overlaps the second window, determining a second histogram of pixel values by modifying the first histogram by extracting a first set of pixels from the first histogram and adding a second set of pixels to the first histogram so that the second histogram has only pixels within the second window, determining a second median value of the pixel values using the second histogram by searching pixel values of the second histogram for the median starting at the median value of the first histogram, and repeating sliding the window determining a histogram and determining a median value until a complete median set of an area of interest of the image is determined, and a display to render the median filtered image.

Further embodiments include a main processor to perform object recognition on the median filtered image.

In further embodiments the image processor is further to determine an offset as a position of an element of the first median value inside a bucket of the median histogram value, determine a remainder as a number of elements to traverse to find the second median value, determine a number of pixels added to the second histogram in the second set of pixels and use the determined number as a number of bins of the second histogram to search from the first median to determine the second median.

Some embodiments pertain to an apparatus that includes means for determining a first histogram for pixel values within a first window in a first position on an image by sorting pixels of the first window into bins of the first histogram, means for determining a median value of the pixel values using the histogram, means for sliding the first window to a second position on the image to generate a second window where the first window overlaps the second window, means for determining a second histogram of pixel values by modifying the first histogram by extracting a first set of pixels from the first histogram and adding a second set of pixels to the first histogram so that the second histogram has only pixels within the second window, means for determining a second median value of the pixel values using the second histogram by searching pixel values of the second histogram for the median starting at the median value of the first histogram, and means for repeating sliding the window determining a histogram and determining a median value until a complete median set of an area of interest of the image is determined.

Further embodiments include means for determining a number of pixels extracted from the first histogram in the first set of pixels from bins on one side of the first median, means for determining a number of pixels added to the first histogram in the second set of pixels to bins on the one side of the median, and means for comparing the number extracted and the number added to determine which side of the second histogram has more pixel values.

In further embodiments the means for searching searches on the side that has more pixel values.

Further embodiments include means for determining an offset as a position of an element of the first median value inside a bucket of the median histogram value and determining a remainder as a number of elements to traverse to find the second median value.

Further embodiments include means for determining a number of pixels added to the second histogram in the second set of pixels and using the determined number as a number of bins of the second histogram to search from the first median to determine the second median.

The invention claimed is:

1. A method comprising:
   determining a first histogram for pixel values within a first window in a first position on an image by sorting pixels of the first window into bins of the first histogram;
   determining a first median value of the pixel values using the first histogram;
   sliding the first window to a second position on the image to generate a second window where the first window overlaps the second window;
   determining a second histogram of pixel values by modifying the first histogram by extracting a first set of pixels from the first histogram and adding a second set of pixels to the first histogram so that the second histogram has only pixels within the second window;
   determining a second median value of the pixel values using the second histogram by searching pixel values of the second histogram for the second median value starting at the first median value of the first histogram; and
   repeating sliding the window determining a histogram and determining a median value until a complete median set of an area of interest of the image is determined.

2. The method of claim 1, further comprising:
   determining a number of pixels extracted from the first histogram in the first set of pixels from bins on one side of the first median;
   determining a number of pixels added to the first histogram in the second set of pixels to bins on the one side of the median; and
   comparing the number extracted and the number added to determine which side of the second histogram has more pixel values.

3. The method of claim 2, wherein searching comprises searching on the side that has more pixel values.

4. The method of claim 1, further comprising determining an offset as a position of an element of the first median value inside a bucket of the median histogram value and determining a remainder as a number of elements to traverse to find the second median value.

5. The method of claim 1, further comprising determining a number of pixels added to the second histogram in the second set of pixels and using the determined number as a number of bins of the second histogram to search from the first median to determine the second median.

6. The method of claim 1, wherein defining the second window comprises moving the first window by one row.

7. The method of claim 1, wherein the first set of pixels corresponds to a first row and the second set of pixels corresponds to a second row.

8. The method of claim 1, wherein searching the second histogram comprises starting at the median of the first histogram.

9. The method of claim 1, wherein extracting a first set of pixels comprises executing an AVX 512 SUBHIST instruction.

10. The method of claim 1, wherein adding a second set of pixels comprises executing an AVX 512 ADDHIST instruction.

11. The method of claim 1, wherein searching the second histogram comprises executing an AVX 512 GETMIDP instruction using the first median as the M1 starting point.

12. The method of claim 1, further comprising receiving the image from memory and placing the first window on the image.

13. A non-transitory computer-readable medium having instructions stored thereon that when operated on by the computer cause the computer to perform operations comprising:
   determining a first histogram for pixel values within a first window in a first position on an image by sorting pixels of the first window into bins of the first histogram;
   determining a first median value of the pixel values using the histogram;
   sliding the first window to a second position on the image to generate a second window where the first window overlaps the second window;
   determining a second histogram of pixel values by modifying the first histogram by extracting a first set of pixels from the first histogram and adding a second set of pixels to the first histogram so that the second histogram has only pixels within the second window;

determining a second median value of the pixel values using the second histogram by searching pixel values of the second histogram for the second median value starting at the first median value of the first histogram; and repeating sliding the window determining a histogram and determining a median value until a complete median set of an area of interest of the image is determined.

14. The non-transitory medium of claim 13, the operations further comprising:

determining a number of pixels extracted from the first histogram in the first set of pixels from bins on one side of the first median;

determining a number of pixels added to the first histogram in the second set of pixels to bins on the one side of the median; and comparing the number extracted and the number added to determine which side of the second histogram has more pixel values.

15. The non-transitory medium of claim 14, wherein searching comprises searching on the side that has more pixel values.

16. The non-transitory medium of claim 13, the operations further comprising determining an offset as a position of an element of the first median value inside a bucket of the median histogram value and determining a remainder as a number of elements to traverse to find the second median value.

17. The non-transitory medium of claim 13, the operations further comprising determining a number of pixels added to the second histogram in the second set of pixels and using the determined number as a number of bins of the second histogram to search from the first median to determine the second median.

18. A computing system comprising:

a camera to capture an image;

an image processor apply a median filter to the image by determining a first histogram for pixel values within a first window in a first position on an image by sorting pixels of the first window into bins of the first histogram, determining a first median value of the pixel values using the histogram, sliding the first window to a second position on the image to generate a second window where the first window overlaps the second window, determining a second histogram of pixel values by modifying the first histogram by extracting a first set of pixels from the first histogram and adding a second set of pixels to the first histogram so that the second histogram has only pixels within the second window, determining a second median value of the pixel values using the second histogram by searching pixel values of the second histogram for the second median value starting at the first median value of the first histogram, and repeating sliding the window determining a histogram and determining a median value until a complete median set of an area of interest of the image is determined; and a display to render a median filtered image according to the complete median set.

19. The computing system of claim 18, further comprising a main processor to perform object recognition on the median filtered image.

20. The computing system of claim 18, wherein the image processor is further to determine an offset as a position of an element of the first median value inside a bucket of the median histogram value, determine a remainder as a number of elements to traverse to find the second median value, determine a number of pixels added to the second histogram in the second set of pixels and use the determined number as a number of bins of the second histogram to search from the first median to determine the second median.

* * * * *